May 31, 1960  R. F. WERNLUND  2,939,122
FORCE TO DIRECT CURRENT TRANSDUCER
Filed Dec. 30, 1955

INVENTOR.
Roger F. Wernlund.
BY
HIS ATTORNEY

United States Patent Office 2,939,122
Patented May 31, 1960

2,939,122
FORCE TO DIRECT CURRENT TRANSDUCER

Roger F. Wernlund, Southampton, Pa., assignor to Robertshaw-Fulton Controls Company, Richmond, Va., a corporation of Delaware Filed Dec. 30, 1955, Ser. No. 556,639
2 Claims. (Cl. 340—187)

This invention relates to transducers and more particularly to transducers for converting forces which are representative of variables such as mechanical movements, temperatures, fluid flows, and pressures into proportional direct currents.

It is an object of this invention to produce an output current which is proportional to the square root of an input force.

Another object of this invention is to utilize an extremely sensitive pick-up device of the flapper-nozzle type in combination with an electrical balancing circuit to permit the maximum loop gain of the system.

Another object of the invention is to insure complete stability of a force-to-current transducer against supply pressure and line voltage variations.

Another object of the invention is to eliminate the use of vacuum tubes in a force-to-current transducer thereby reducing maintenance costs and down time.

The present invention utilizes a deflection beam to which the variable to be measured is applied in the form of a force to cause deflection or movement of one end of the beam. A stationary nozzle is positioned adjacent to the other end of the beam so as to vary the pressure in a pneumatic circuit in accordance with the deflection of the beam. The change in pressure of the pneumatic circuit is adapted proportionally to vary the resistance of a carbon pile. The carbon pile is connected in a circuit for energizing a balancing coil placed in a magnetic field and secured at the end of the beam adjacent to the nozzle to be movable with that end of the beam.

The balancing coil is connected in series with another coil on a pole piece whereby energization of both coils produces a force on the beam which is proportional to the square root of the current flowing in the coils. Energization of the balancing coil in accordance with the resistance change in the carbon pile will exert a force upon that end of the beam for balancing the initial force of the condition to be measured, thus completing the servo loop of the system. Suitable compensating means in the form of pneumatic restrictors and a damping tank are employed in the pneumatic portion of the loop to provide loop stability when using the extremely sensitive pick-up characteristics of the nozzle-beam arrangement.

Other objects and advantages will appear from the following specification taken in connection with the accompanying drawings wherein.

Figure 1:
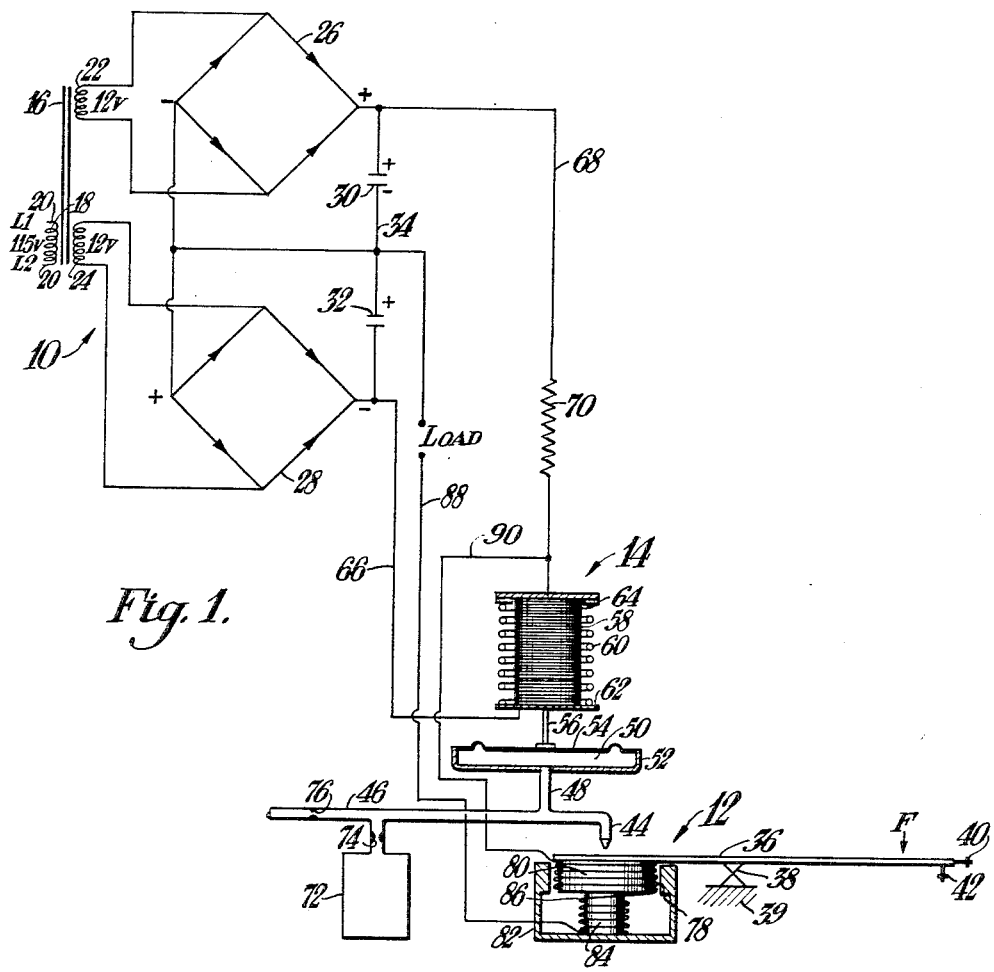
Fig. 1 is a schematic view of the transducer and control circuit therefor.

Referring more particularly to the Fig. 1, the transducer comprises a rectifier circuit, generally indicated by the reference numeral 10, a flapper-nozzle pneumatic sensing device generally indicated by the reference numeral 12 and a carbon pile electric balancing circuit generally indicated by the reference numeral 14.

The rectifier circuit 10 is provided with a step-down transformer 16 having a primary winding 18 connected by a pair of lead lines 20 to a source of alternating line voltage L1, L2. A pair of secondary windings 22, 24, with an output of approximately 12 volts is each inductively wound around the primary winding 18 and serves to supply a pair of metallic rectifier bridges 26, 28 respectively with alternating current. A pair of filtering condensers 30, 32 are connected by a conductor 34 to the positive and negative terminals of the bridges 26, 28, respectively.

The flapper-nozzle sensing device 12 includes a baffle lever or arm 36 which is adapted to receive a force F adjacent to one end thereof, representative of the condition to be measured, controlled and/or recorded. This force F may be exerted by a spring, bellows, Bourdon tube or diaphragm and the like, the expansion or contraction of which is indicative of a pressure differential, pressure change, temperature and the like. The lever 36 is pivoted centrally thereof on a cross-flexure 38 mounted on a support 39, and is provided with a pair of longitudinally and transversely extending adjustable counterweights 40, 42 respectively at the force receiving end thereof. It will be apparent that as viewed in the drawing the longitudinal counterweight 40 stabilizes the lever 36 against vertical vibration or movement of the lever support 39 and the transverse counterweight 42 stabilizes against horizontal vibration of the support.

The other end of the lever 36 is located in flow controlling association with a nozzle 44 as determined by the force F exerted on the remote end of the lever 36. The nozzle 44 has a conduit 46 leading thereto for supplying a pneumatic flow to the nozzle 44 from any suitable source. It will be apparent that as the lever 36 is rotated in a clockwise direction, the same will approach the tip of the nozzle 44 to restrict the flow therethrough and, consequently, increase the fluid pressure within the conduit 46. Conversely, a counterclockwise rotation of the lever 36 will increase the gap between the tip of the nozzle 44 and the lever 36 to decrease the fluid pressure in the conduit 46.

The conduit 46 is connected by a pipe 48, adjacent to the nozzle 44, for communication with a chamber 50 defined by a cup-shaped support 52 and a diaphragm 54 secured across the open end thereof. Centrally connected above the diaphragm 54 is a transmission rod 56 which serves to transmit the force exerted by the pressure in the chamber 50 upon the diaphragm 54 to a carbon pile 58 for compressing the same in accordance with the pressure in the chamber 50. Opposing this force on the carbon pile 58 is an adjustable coil spring 60 held in compression between a suitable flange 62 mounted on one end of the carbon pile 58 and one surface of the support 64 for the pile 58. The spring 60 provides a means for preventing compression of the carbon pile 58 by the initial operating pressure in the chamber 50. Adjustment of the spring 60 determines the nozzle pressure required to completely compress the carbon pile 58.

The carbon pile 58 is connected in a series circuit to the output terminals of the rectifier circuit 10 by a pair of conductors 66, 68. A resistor 70 is in series with the carbon pile 58, between the same and the positive terminal of the rectifier bridge 26 and is utilized to determine the resistance operating range of the carbon pile 58. To complete the pneumatic system, a capacity tank 72, is connected to the conduit 46 between the source and the nozzle 44. A restriction 74 is positioned between the conduit 46 and the interior of the tank 72, and a second restriction 76 is positioned upstream of the tank 72 for a purpose to be described hereinafter.

A feedback circuit is arranged to electrically balance the beam 36 and takes the form of a coil 78 wound around a hollow cylindrical conducting form 80 secured at the end of the lever 36 adjacent to the nozzle 44. The coil 78 and the form 80 are adapted to be received in the interior of a magnet assembly 82, having a soft iron pole piece 84 on which a coil 86 is wound. The coils 78, 86 are connected in series whereby an equal current flows through both said coils upon energization thereof. The windings of the coils 78, 86 are further arranged whereby an increase in current flowing in the coil 86 will produce an increased magnetic flux in the magnetic gap and the increase in current also flowing in coil 78 in conjunction with said increased magnetic flux will produce an increased force on coil 78 in a downward direction. A decrease in current in coils 78, 86 will produce a decrease in the downward force on the coil 78 in a similar manner.

The coils 78, 86 are connected to the rectifier circuit 10 between the filter capacitors 30, 32 by a conductor 88 and to the carbon pile circuit 14 between the resistor 70 and the carbon pile 58 by a conductor 90. The conductor 88 may be broken at any point to be connected to a measuring device, recorder and/or controller.

*Operation*

In the operation of the embodiment of Fig. 1, assume that the lever 36 is in a balanced condition whereby the rectifier bridge circuit 10 will furnish a constant current output in the conductors 66, 68. The source of pneumatic pressure will furnish a steady flow of fluid to the nozzle 44 so that the apparatus is in condition for a force to be applied to the lever 36. The force F may be supplied by any suitable device which will cause a deflection of the beam 36 in response to any variable to be measured or controlled. Assuming that a change in the force F or an initial force is applied in a downward direction, as viewed in the drawing, the lever 36 will rotate in a clockwise direction to decrease the gap between the lever 36 and the nozzle 44 and thus increase the pneumatic pressure in the conduit 46 as previously explained.

This increased pneumatic pressure in the conduit 46 is conducted by the conduit 48 to the chamber 50 where it is applied to the diaphragm 54. Since the pneumatic pressure in the chamber 50 is increased, the diaphragm 54 will move outwardly and cause the rod 56 carried thereby to impart a compression force upon the carbon pile 58. This compression force on the pile 58 will decrease the effective resistance thereof which causes an increased current in the output conductors 66, 68 of the rectifier bridge circuit 10. This increase in the output current is sensed at the coils 78, 86 by way of the conductors 88, 90 and will cause downward movement of the form 80 for exerting a force upon a lever 36 in opposition to the force F applied thereto. Upon this occurrence, the lever 36 will move away from the nozzle 44 to increase the gap therebetween until the current in the coil 78 reaches a value wherein the torque induced by the force developed by the coil 78 is equal to the torque induced by the force F. A load or current receiver (not shown) connected in series with the conductor 88 will experience this change in current as being in proportion to the force F as will now be described.

This increased current in the conductors 88, 90 flows through the serially connected coils 78, 86 which produces a balancing force on the lever 36. The beam motion required for balance is very small due to the high gain of the detection and rebalance system. The flexure 38 is of light weight and consequently the spring constant and resultant force applied to the lever 36 is very small in comparison to other forces on the system and can be ignored. Thus, the beam will rebalance when:

$$F_1 X_1 = F_X$$

where $F_1$=rebalancing force
$X_1$=distance along the beam 36 measured horizontally from the axis of coil 78 to the flexure 38.
$X$=distance measured along the beam 36 horizontally from line of application of force F to the flexure 38.

Therefore $$F = F_1 \frac{X_1}{X} = K_1 F_1$$

where $$K_1 = \frac{X_1}{X}$$

It will now be apparent that the force $F_1$ produced on the lever 36 in response to the increased current flowing in the coils 78, 86 will be:

$$F_1 = N_1 I \phi$$

where $F_1$=rebalancing force
$N_1$=number of turns on the coil 78
$\phi$=magnetic flux in the gap
$I$=current flowing in the coils 78, 86

It will be apparent however that $$\phi = K_2 N_2 I$$

where $K_2$=constant of the magnetic path
$N_2$=number of turns on pole piece coil 86
$I$=current flowing in coils 78, 86

Since the current in both coils are equal, the above equations may be combined in the following manner:

$$F_1 = N_1 I (K_2 N_2 I)$$
$$= K_2 N_1 N_2 I^2$$

Substituting this value of $F_1$ in the original relationship of $F_1$ and F we have:

$$F = K_1 (K_2 N_1 N_2 I^2)$$
$$= K_3 I^2$$

where $$K_3 = K_1 K_2 N_1 N_2 = \text{a constant}$$

It will thus be apparent that since the balancing force $F_1$ is proportional to the force F applied to the lever, the current flowing in the conductors 88, 90 has a square root relationship with the force F.

If the force F is decreased or removed, the lever 36 will rotate in a counterclockwise direction. This movement is caused by the torque exerted on the lever 36 by the coil 78 and the gap between the nozzle 44 and the lever 36 will increase. The pressure in the conduit 46 and chamber 50 is consequently decreased. The rod 56 will then move downwardly to release the force on the carbon pile 58 with a resulting increase in the resistance therethrough. This increase in resistance causes a decrease in the current in the coils 78, 86 thus permitting the same to move upwardly to reduce the gap between the nozzle 44 until the current in the coil reaches a value which varies in proportion to the square of the newly applied force F.

It will be apparent that any line voltage variation in the lines L1, L2 will cause a corresponding variation in the current flow in the conductors 88, 90 and the coils 78, 86. However, this variation will be compensated for by the repositioning of the form 80 and the lever 36 with respect to the nozzle 44 for adjusting the gap between the same and the lever 36. Adjustment of the gap will proportionately adjust the resistance in the output circuit of the rectifying circuit for increasing or decreasing the current therethrough as the case may be and restore the original output current before the line variation.

In similar fashion, any variation in pressure at the source will vary the pressure in the chamber 50 for adjusting the resistance of the carbon pile 58. Variation of the current in the rectifier output circuit will be immediately felt at the coils 78, 86 resulting in the repositioning of the lever 36 and the readjustment of the gap between the same and the nozzle 44. This movement of the lever 36, in effect, will restore the original pressure in the conduit 46 without affecting the current in the output circuit.

The invention is also stabilized against sudden pressure variations from the source by the compensating tank 72 and the restrictions 74, 76. Any sudden build-up of pressure in the conduit 46 will cause leakage of the fluid through the resistor 74 into the tank 72 thus bleeding out a portion of fluid in the system and allowing a steady and relatively slow increase of the pressure build-up. Similarly, any sudden decrease in pressure will permit the slow escape of the fluid from the tank 72 into the conduit 46 to slow down the decrease of the pressure.

The compensating tank 72 also serves the purpose of allowing the electrical circuit and the sensing device, comprising the lever 36 and the nozzle 44, to be made highly sensitive without affecting the stability of the system. By proper dimensioning of the nozzle 44 and the gap between the same and the lever 36, the sensing ability of these elements can be greatly increased and any tendency for self-oscillation of the apparatus will be suppressed by the action of the restrictions 74, 76 and the tank 72.

The invention herein shown and described is capable of various applications. One application to which the device is particularly adapted is in flow measuring apparatus. It is well known that the output from a flow meter is proportional to the square of the flow. If this output is applied to the lever 36, the current flowing in the conductors 88, 90 will be directly proportional to the flow since the output current is proportional to the square root of the applied force F.

Figure 2:
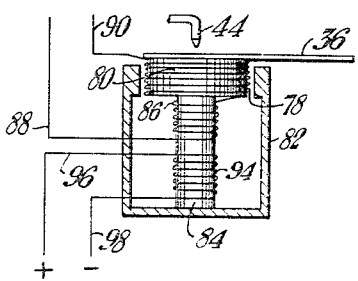
Fig. 2 is a schematic showing of a portion of the transducer and another embodiment of the invention.

Another embodiment of the balancing circuit for the beam 36 is shown in Fig. 2. In this embodiment, a second coil 94 is wound on the pole piece 84 insulated from the coil 86 and connected to constant source of D.C. current by lead wires 96, 98. With this arrangement, the rebalancing force is equal to the force produced by the interaction between the current in the coil 78 and the constant flux produced by the coil 94 plus the previously described force produced by the coils 78, 86 or:

$$F = \frac{X_1}{X}(F_1 + F_2)$$

The force produced by the coil 94 is:

$$F_2 = N_1 \phi_1 I$$

where $N_1$ = number of turns on the coil 78
$\phi_1$ = constant flux produced by the coil 94
$I$ = current flowing in coils 78, 86.

Thus, the force F may be expressed as $$F = K_3 I^2 + \frac{X_1}{X} N_1 \phi_1 I$$
$$= K_3 I^2 + K_4 I$$
$$= K_4 I + K_3 I^2$$

where $$K_4 = \frac{X_1}{X} N_1 \phi_1$$

The last equation may be solved in the following manner for I:

$$I = -\frac{K_4 \pm \sqrt{K_4^2 + 4K_3 F}}{2K_3}$$

Since the current I flowing in coils 78, 86 equals zero when the force F equals zero, $$I = -\frac{K_4 \pm \sqrt{K_4^2 + 0}}{2K_3} = -\frac{K_4 \pm K_4}{2K_3}$$

Obviously, $I = 0$ when the positive root of the radical is used and accordingly the only root which satisfies the above relationship of F and I is:

$$I = -\frac{K_4 + \sqrt{K_4^2 + 4K_3 F}}{2K_3}$$

Computation has shown that the last equation closely approximates the equation:

$$I = +\sqrt[n]{K_4 F}$$

where $n$ is between 1 and 2.

The embodiment of the balancing circuit shown in Fig. 2 is of great importance when working with a differential pressure measurement of flow. For example, it is normally assumed that the flow of fluid through an orifice is proportional to the square root of the differential pressure. In practice, however, it is found that the flow is proportional to the $N^{th}$ root of differential pressure where N varies from 1.5 to 1.9 depending on the material, orifice size and other constants.

It will be apparent that the value of N may be varied between 1 and 2 by varying the term $F_2$ in the above derivation, such as by varying the constant D.C. source, and the current flowing in coil 94. Accordingly, the device is adaptable to various flow measuring applications and can approximate numerous quantities involving mathematical root relationships.

Although only one embodiment of the invention has been herein shown and described, it will be apparent to those skilled in the art that various changes and arrangement of parts may be made without departing from the scope of the invention as defined in the appended claims.

It is claimed and desired to secure by Letters Patent:

1. In a system for controlling a variable force including a pneumatic pressure supply, a source of alternating voltage, and a source of direct voltage, the combination comprising a bridge circuit connected to the source of alternating voltage, a variable impedance element connected in series with said bridge circuit for varying the output current of said bridge circuit, means defining an expansible chamber connected to the pressure supply and having an end wall movable in response to variations in pressure within said chamber, said end wall being operatively connected to said impedance for varying the value of the same in response to variations in pressure within said chamber, a nozzle communicating with said chamber, a pivotal lever disposed in flow controlling relationship with said nozzle, means for pivoting said lever an amount proportional to the deviation of the variable for varying the pressure within said chamber in accordance with said deviation to thereby effect a proportionate change in output current of said bridge circuit, an electromagnetic coil connected to the output side of said bridge circuit and carried by said lever, a magnetic pole member positioned adjacent said lever, a second electromagnetic coil wound on said pole member and connected in series with the first said coil, and a third electromagnetic coil would on said pole member and connected to the source of direct voltage, said coils being cooperative to produce a balancing force on said lever in opposition to the variable.

2. In a system for controlling a variable force including a pneumatic pressure supply, a source of alternating voltage, and a source of direct voltage, the combination comprising a bridge circuit adapted to be connected to the source of alternating voltage, a variable impedance element connected in series with said bridge circuit for varying the output current of said bridge circuit, means defining an expansible chamber adapted to be connected to the pressure supply and having an end wall movable in response to variations in pressure within said chamber, said end wall being operatively connected to said impedance for varying the value of the same in response to variations in pressure within said chamber, a nozzle communicating with said chamber, an elongated pivotal lever having one side disposed in flow control relationship at substantially right angles with said nozzle, means for pivoting said lever in an amount proportional to the deviation of the variable for varying the pressure within said chamber in accordance with said deviation to thereby effect a proportional change in output current of said bridge circuit, an electromagnetic coil connected to the output side of said bridge circuit and secured to the side of the lever opposite said nozzle with the axis of said coil substantially coincident with said nozzle, a cylindrical magnetic pole member positioned adjacent said lever with the longitudinal axis of said pole member substantially coincident with the axis of said coil, a second electromagnetic coil wound on said pole member and connected in series with the first said coil, and a third electromagnetic coil wound on said pole member and connected to the source of direct voltage, said coils being cooperative to produce a balancing force on said lever acting in the same direction as the flow from said nozzle in opposition to the variable.

References Cited in the file of this patent

UNITED STATES PATENTS

| | | |
|---|---|---|
| 1,191,416 | Gibson | July 18, 1916 |
| 2,319,363 | Wuncsh et al. | May 18, 1943 |
| 2,360,751 | Ziebolz | Oct. 17, 1944 |
| 2,669,874 | Ziegler | Feb. 23, 1954 |
| 2,670,464 | Wuensch et al. | Feb. 23, 1954 |
| 2,780,101 | Kinkel | Feb. 5, 1957 |
| 2,822,689 | Bonapace | Feb. 11, 1958 |

FOREIGN PATENTS

| | | |
|---|---|---|
| 813,898 | Germany | Sept. 17, 1951 |